United States Patent
Friesen et al.

(10) Patent No.: US 12,418,414 B2
(45) Date of Patent: Sep. 16, 2025

(54) METHOD FOR IMPLEMENTING AND USING CRYPTOGRAPHIC MATERIAL IN AT LEAST ONE SYSTEM COMPONENT OF AN INFORMATION TECHNOLOGY SYSTEM

(71) Applicant: MERCEDES-BENZ GROUP AG, Stuttgart (DE)

(72) Inventors: Viktor Friesen, Karlsruhe (DE); Viktor Pavlovic, Stuttgart (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 98 days.

(21) Appl. No.: 18/687,532

(22) PCT Filed: Aug. 2, 2022

(86) PCT No.: PCT/EP2022/071725
§ 371 (c)(1),
(2) Date: Feb. 28, 2024

(87) PCT Pub. No.: WO2023/030811
PCT Pub. Date: Mar. 9, 2023

(65) Prior Publication Data
US 2024/0356746 A1 Oct. 24, 2024

(30) Foreign Application Priority Data
Aug. 31, 2021 (DE) ............ 10 2021 004 427.4

(51) Int. Cl.
*H04L 9/14* (2006.01)
*H04L 9/30* (2006.01)
*H04L 9/32* (2006.01)

(52) U.S. Cl.
CPC .............. *H04L 9/14* (2013.01); *H04L 9/30* (2013.01); *H04L 9/3247* (2013.01); *H04L 9/3265* (2013.01)

(58) Field of Classification Search
CPC . H04L 9/14; H04L 9/30; H04L 9/3247; H04L 9/3265; H04L 9/0877; H04L 9/0897; G06F 21/602
See application file for complete search history.

(56) References Cited

U.S. PATENT DOCUMENTS 8,989,386 B2 * 3/2015 Falk ............... H04L 9/0891
380/278
11,477,639 B2 10/2022 Winkelvos
(Continued)

FOREIGN PATENT DOCUMENTS

| CN | 112422595 A | * | 2/2021 | ........... H04L 63/061 |
| CN | 116569138 A | * | 8/2023 | ........... H04L 9/0891 |

(Continued)

OTHER PUBLICATIONS

Extended European Search Report dated Feb. 12, 2024 in related/corresponding EP Application No. 23209295.7.
(Continued)

*Primary Examiner* — Shahriar Zarrineh
(74) *Attorney, Agent, or Firm* — PATENT PORTFOLIO BUILDERS PLLC (57) ABSTRACT

A method for implementing and using cryptographic material in at least one system component of an information technology system for performing at least one operation involves describing a state of the system component by at least one variable is checked at least at a first time. The cryptographic material is supplemented with additional data describing possible states of system components. The cryptographic material is used by the system component when the additional data of the cryptographic material include comprise at least the state that the system component has at (Continued)

the first time. The additional data are formed by at least one condition, at least one role, and/or at least one target component identity.

14 Claims, 3 Drawing Sheets

(56) References Cited

U.S. PATENT DOCUMENTS

| | | | |
|---|---|---|---|
| 11,764,957 B2 | 9/2023 | Friesen et al. | |
| 2004/0003231 A1* | 1/2004 | Levenson | B60R 16/0234 |
| | | | 713/155 |
| 2004/0003249 A1* | 1/2004 | Dabbish | H04L 9/3247 |
| | | | 713/170 |
| 2006/0059149 A1* | 3/2006 | Dunki | G06F 21/6227 |
| 2011/0067086 A1 | 3/2011 | Nachenberg et al. | |
| 2018/0139060 A1* | 5/2018 | Lin | H04L 9/3226 |
| 2019/0068361 A1* | 2/2019 | Ye | H04W 4/48 |
| 2020/0177398 A1* | 6/2020 | Takemori | H04L 63/0823 |
| 2021/0075607 A1 | 3/2021 | Li | |
| 2022/0307847 A1 | 9/2022 | Friesen et al. | |

FOREIGN PATENT DOCUMENTS

| | | | | |
|---|---|---|---|---|
| DE | 102019003904 A1 | 12/2020 | | |
| DE | 102019212959 B3 | 3/2021 | | |
| DE | 102020003072 B3 | 7/2021 | | |
| EP | 3261013 A1 * | 12/2017 | ............ | G06F 21/72 |
| JP | 2013504821 A | 2/2013 | | |
| JP | 2018010433 A | 1/2018 | | |
| WO | WO-2017220389 A1 * | 12/2017 | ............ | G06F 21/72 |
| WO | WO-2020145086 A1 * | 7/2020 | ............... | H04L 9/14 |
| WO | WO-2021138591 A1 * | 7/2021 | ............... | H04L 9/50 |

OTHER PUBLICATIONS

Extended European Search Report dated Feb. 23, 2024 in related/corresponding EP Application No. 23209296.5.
Extended European Search Report dated Feb. 23, 2024 in related/corresponding EP Application No. 23209297.3.
Extended European Search Report dated Feb. 23, 2024 in related/corresponding EP Application No. 23209298.1.
International Search Report and Written Opinion mailed Dec. 2, 2022 in related/corresponding International Application No. PCT/EP2022/071725.
Office Action created May 3, 2022 in related/corresponding DE Application No. 10 2021 004 427.4.
Office Action dated Feb. 9, 2024 in related/corresponding EP Application No. 22 761 462.5.
Office Action dated Apr. 1, 2025 in related/corresponding JP Application No. 2024-513414.

* cited by examiner

METHOD FOR IMPLEMENTING AND USING CRYPTOGRAPHIC MATERIAL IN AT LEAST ONE SYSTEM COMPONENT OF AN INFORMATION TECHNOLOGY SYSTEM

BACKGROUND AND SUMMARY OF THE INVENTION

Exemplary embodiments of the invention relate to a method for implementing and using cryptographic material in at least one system component of an information technology system.

The method for implementing and using cryptographic material essentially relates to the fact that, cryptographic material corresponding to the current security level of the respective system component or a sub-module of the system component must be used in different lifecycle phases of system components of an information technology systems that are equipped with cryptographic material. This relates in particular, but not exclusively, to the field of what is known as CarIT security for vehicles.

Modern vehicles, but also other systems, are characterized by an increasing degree of networking. The vehicles are connected not only to generally accessible systems such as the Internet, but also to dedicated systems operated by the vehicle manufacturer or OEM, for example the manufacturer's own applications and their own server, which is often also referred to as a backend server. These are developed, marketed, and operated by the manufacturer exclusively for its own vehicle fleet. All of this together is also referred to as a vehicle ecosystem.

In practice the diverse communication relationships between the individual system components within such a vehicle ecosystem result in a plurality of new interfaces and applications being created, all of which must be secured by suitable cryptographic methods, such as mechanisms, protocols, etc. These cryptographic methods, which are known in principle from the prior art, require a wide variety of cryptographic material for this such as asymmetric key pairs, symmetric keys, certificates, random numbers, hash values, etc. All of these cryptomaterials coordinated with each other and are often introduced into all participating system components in the vehicle ecosystem before they are commissioned and have to be used by them to exchange cryptomaterial during ongoing operation as well. The provision of the cryptographic material, known as provisioning, takes place, for example, in the context of the manufacturing process, but it can also take place during operation of the system components. These system components comprise, in particular, control units installed in the vehicles, but also other components such as for example applications installed in the vehicle, applications of the OEM available on a smartphone, vehicle-external devices and the like.

In order to reliably protect the communication from being interfered with, it is absolutely essential to distinguish between cryptographic material used during the development phase and cryptographic material used during the productive phase, in other words the real use of the finished product. The cryptographic material for the development phase is also referred to hereinafter as test cryptomaterial. In the development phase, if the cryptomaterial is confidential, only such test cryptomaterial may be used. The productive cryptomaterial, and here in particular confidential productive cryptomaterial, must be protected against unauthorized access during the entire lifecycle of the system component. This protection should ideally be ensured by adhering to a special secured process and using special protection mechanisms in the respective development departments and production facilities. However, in the development phase this is often not sufficiently guaranteed, since various components of the information technology system have usually not or not yet been realized or implemented in this development phase.

For example, the secure generation of the required cryptographic material may not yet have been fully implemented or tested. The secure transmission of the cryptographic material from the generating server, the so-called cryptomaterial server, to the system manufacturer, for example a supplier, may not yet be guaranteed. The secure introduction of the cryptomaterial into the system component has not yet been implemented or finished. The secure storage of the cryptographic material in this system component might not yet have been implemented because, for example, the target system has not installed any hardware security module (HSM) yet, although the HSM is to be installed at a later time. The secure use of the cryptographic material in the system may not have been implemented yet, for example, because there are development interfaces required for testing and debugging that have a read and write access to the entire system and thus, in particular, also allow access to the installed cryptographic material during the development phase. These are necessarily available during development, however, and are usually also freely accessible to all persons and/or companies involved in the development process.

As a result, it is not possible to ensure that cryptomaterial used during the development phase is not manipulated or read out. However, this test cryptomaterial has an identical structure and form to the productive cryptomaterial that is used later. It is thus also suitable for use in later operation, i.e., in the productive phase of the respective system component. It is therefore particularly important that the relatively poorly secured test cryptomaterial that is therefore highly likely to be corrupted is not misused in the productive system. It is even more serious if productive cryptomaterial ends up on a system component in the development phase. This material, which needs a very high level of protection, can then also be manipulated or read out in whole or in part. It is therefore no longer secret and cannot be used. If the error goes unnoticed or is deliberately hidden, the system component that later changes to the productive phase is no longer secure.

In practice, the security regulations and guidelines are implemented by the persons involved in the phases with the system components. Therefore, errors, mistakes and also deliberate manipulation cannot be ruled out. In principle, there is therefore always a risk that test cryptomaterial will remain in a system component that has already switched to the productive or that the productive cryptomaterial will be used on a system component that is still in the development phase. There is a high probability that any cryptomaterial used deliberately or accidentally in the development phase will be corrupted because of the many interfaces that are still open, etc. These dangers ultimately lead to an increased security risk. This is a serious disadvantage of the existing approach.

A method for securely using cryptographic material is already known from DE 10 2020 003 072 B3. Here, a plurality of system components of a networked system are provided with cryptographic material. The cryptographic material has a mark that distinguishes the cryptographic material as development or productive material. The individual system components have a binary status flag that indicates whether the corresponding system component is in the development or productive phase of its lifecycle phase. The mark of the cryptographic material is then compared with the binary status flag of the respective system component. If the mark and the flag match, i.e., if the cryptographic material is marked, for example, as development material and the system component is in the development phase, then the corresponding cryptographic material is used by the system component. If, by contrast, the mark and the binary status flag do not match then security measures are initiated. The match between the mark of the cryptographic material and the binary status flag is checked before the respective use of the cryptographic material or once for the entire cryptographic material in the system component. The match can, for example, be checked when the system component is booted up or also when the cryptographic material is provided. As a security measure, a warning message can be issued, the provision of the cryptographic material can be cancelled or prevented and/or cryptographic material already introduced into a system component can be deleted.

A disadvantage of this, however, is that to distinguish whether cryptographic material may be used on the system component, a distinction is only made between two lifecycle phases of the corresponding system component and two different properties (test or productive) for the cryptographic material. In actual use, a distinction between only two groups will not suffice because the conditions for the secure use of cryptographic material are too different for different cryptographic materials and system components. If, for example, a secret is generated and stored directly in a hardware security module and never leaves it, the cryptographic material may be used securely even during the development phase. However, a prerequisite for this is that the hardware security module does not have or use any special diagnostic interfaces in the development phase that would allow the secret to be read out. A secret included in software, by contrast, is part of a program code and can thus be read out or reconstructed easily via diverse interfaces. Secure use of such a secret in a later productive phase of the system component is then not possible.

The present invention is directed to an improved method for implementing and using cryptographic material in at least one system component of an information technology system, which allows a wide variety of different cryptographic materials to be implemented and used in various system components in a particularly flexible and secure manner, the method ensuring in the process that in the case of a system component which itself, or at least one sub-module of which, is operated in an insecure mode, cryptographic material suitable for insecure operation is used by a system component or at least the sub-module, and in the case of a system component which itself, or at least one sub-module of which, is operated in a secure mode, cryptographic material suitable for secure operation is used by the system component or at least the sub-module.

In a method for implementing and using cryptographic material in at least one system component of an information technology system of the type mentioned above, the cryptographic material has additional data, which according to the invention, are formed by at least one condition, at least one role and/or at least one target component identity.

The method according to the invention allows cryptographic material to be implemented and used in a wide variety of system components and/or their sub-modules in a particularly flexible and secure manner. For example, different system components such as a control unit, a cloud server, an application executed on a mobile terminal, a vehicle, or an external device require the use of a wide variety of cryptographic materials, such as symmetric or asymmetric keys, certificates, random numbers, hash values, or like at different times. Thus, a particular target system component that is intended to use cryptographic material can also require the use of different cryptographic materials in different states. The state of the respective system component is described here using at least one variable. The corresponding system component can assume a multiplicity of different states, thus also have more than two states, such as being in a development phase or a productive phase of a lifecycle. Individual sub-modules of a system component can also be in different lifecycle phases or states. For example, a network interface can be in a first, insecure state, and a memory element of the system component can be in a second, secure state. A corresponding information technology system can networked or isolated.

Cryptographic material is typically generated by a dedicated system, for example a cryptomaterial server, and transmitted as part of a special data package to a target system, i.e., a target system component. In this case, according to the invention, the cryptographic material is supplemented with additional data. A corresponding condition specifies under which circumstances the use of the cryptographic material is or is not permitted by the system component. The corresponding conditions can vary greatly. For example, the condition might demand that the respective system component is in a certain portion of a product lifecycle, or that the system component has a hardware security module, and that this is in a secure state so that the hardware security module can securely receive and store cryptographic material. The cryptographic material can also comprise a plurality of conditions. As a result, the implementation and use of cryptographic material in different system components can be controlled in an even greater number of different use scenarios.

Cryptographic material provided for a system component fulfils a certain role there. If several cryptographic materials of the same type are used by the same system component, for example several public 4096-Bit-RSA keys, the system component itself cannot distinguish which role the new cryptographic material is meant to play, for example how and where it is meant to be installed in the system component and how it is meant to be used. This information relating to the role of the cryptographic material can be appended to the cryptographic material in the form of the role. The role differs from the condition in such a way that the role does not impose a condition on the current state of the system component.

To be able to distinguish particularly effectively in which system component cryptographic material may be used, the cryptographic material can be supplemented with a target component identity. This target component identity comprises a unique identifier of the system components that are allowed to use the corresponding cryptographic material. If the corresponding cryptographic material is applied to a system component which is not included in the target component identity, then the use of the cryptographic material on this system component is prevented. This makes it particularly easy and quick to envisage which system components are authorized to use which cryptographic material and which are not.

The target component identity can be directed both to an entire class of systems, system components, and/or their sub-modules, for example to the class "head unit", "engine control unit", "flash memory", or the like, and to exactly one special system component, for example the hardware security module with the serial number "GHNS-1934952".

Using the at least one condition, at least one role, and/or at least one target component identity it is possible to very efficiently and flexibly control which cryptographic material may and may not be used in which use scenario, i.e., in which states of which system component and/or its submodules.

The cryptographic material is typically formed as a cryptomaterial (data) package and exchanged between systems or system components or introduced there. This cryptomaterial package comprises at least the actual cryptographic material, for example an asymmetric key pair, and the respective condition, role, and/or target component identity in the form of additional data appended to the cryptographic material. For this purpose, the appended data can, for example, be concatenated with the cryptographic material. The cryptomaterial package can also comprise further data. For the sake of simplicity, only the cryptographic material is referred to in the present text.

An advantageous development of the method according to the invention provides that the cryptographic material comprises at least one target-component-specific role. If one and the same cryptographic material is sent to various system components, it can also fulfil different roles on the different system components. Thus, target-component-specific roles can be introduced into the cryptographic material, which inform the cryptographic material on which system component it should be used. This allows even more comprehensive and flexible control of how cryptographic material is implemented and used on different auf system components.

In accordance with a further advantageous embodiment of the method according to the invention, all conditions are defined by a creator external to the system component and evaluated by at least one evaluator executed in an environment of the system component, wherein the creator and the evaluator jointly determine which variables are to be used by the creator in the definition of conditions. For this purpose, the creator and the evaluator can use a fixed set of possible variable and select suitable variables depending on the condition. The creator selects suitable variables for each condition. The number and the type of the conditions are also determined by the creator. The name and permissible value range used for the respective variables is then determined jointly by the creator and evaluator, whereby the evaluator determines which names and value ranges the creator may use. However, it is the creator themselves which decides which names and value ranges it ultimately uses.

The creator is, for example, the already mentioned cryptomaterial server. The evaluator can be designed by hardware and software or also by a human. The evaluator can be comprised by the system component or else can also be external to the system component, but be provided in the same environment as the system component. This allows the evaluator to detect the variables on which the system component is based and the corresponding state of the system component. A system-component-external evaluator makes it possible to check the condition(s) imposed on the system component by means of the cryptographic material when the system component is not yet booted up. Thus, for example corresponding checked cryptographic material can be saved in a memory of the system component without booting up the corresponding system component beforehand.

The evaluator is, in particular, able to check at any time whether any condition for the respective system component has been met or not. By the creator and the evaluator agreeing on a common set of relevant variables, it can be ensured that the variables required for evaluating a certain condition can actually be detected by the evaluator. This increases reliability when using the method according to the invention.

A further advantageous embodiment of the method provides that at least one variable has one of the following value ranges:
BOOLEAN;
INTEGER; or
STRING.

In this case, all variables can have the same value range, i.e., be of BOOLEAN, INTEGER or STRING type, or else individual variables can also have different value ranges. By using the different value ranges or types, a wide variety of variables can be used to define and subsequently check conditions.

A variable of the BOOLEAN type accordingly assumes the value TRUE or FALSE. Using the value ranges INTEGER and STRING, states can be described in even more detail or in a more complex way. Thus, a particular state can be described, for example, using numbers and/or also character strings.

A value range can, for example, range from 1 to 10. The variables used to define a state can, for example, be in the form of a vector. The vector can, for example, comprise a first variable of BOOLEAN type and a second variable of INTEGER type. This variable vector is time-dependent. At a certain point in time, for example, the first variable can assume the value TRUE and the second variable can have the value 24. In this way, the evaluator can evaluate a condition for each system component, the environment of which is in a unique state described by the current values of the variables at a certain point in time t, i.e., to check whether the variables meet the defined conditions or not at the point in time t. The corresponding variable vector can also comprise at least one empty element. This is the case, for example, if the evaluator cannot detect a certain variable. Instead of an empty element, a placeholder can also be used, such as the number "0", "9999" or a character string such as "NAN".

Variables can also be of a structured type, for example variables can be:
ARRAY; or
RECORD,
wherein structured types can be formed from both unstructured and structured types.

In accordance with a further advantageous embodiment of the method, at least one condition is defined target-component-specifically and/or operation-specifically. Thus, the cryptographic material can be used for performing various operations such as installing software, encryption or decryption of specific data, creating or checking a signature, and/or be used by various system components. So that the creator can characterize a condition as operation-specific, i.e., only valid for a particular operation, a set of operations known within the system component has to be communicated to the creator, analogously to the set of usable state variables, so that the creator can use these when defining conditions. This set of operations can be general, i.e., valid for all target components, or target-component-specific.

So that a particular condition can be considered to have been met on different system components and/or when performing different operations, it can be the case that for at least two different system components and/or operations a particular variable has to assume a different value, i.e., once TRUE and once FALSE, or once 0 and once 256.

A further advantageous embodiment of the method according to the invention provides that at least one different variable is used for a target-component-specific and/or operation-specific condition on a different target system component and/or for a different operation. For example, not only can a particular variable assume different values to meet a condition on different system components and/or to perform different operations, but different variables can also be required for this purpose. In particular, the quantity and/or type and a size of a permissible value range of the variables relevant for a condition can differ between different system component and/or operations. For example, to meet a condition on a first system component, the variables 1 and 2 have to assume the values 0 and TRUE and on a second system component, the variables 1, 2 and 3 have to assume the values 0, TRUE and FALSE. On a third system component, however, the variables 1, 2, 3, 4, 5 and 6 have to assume the values TRUE, [0 . . . 100], [−100 . . . 100], 0, "engaged" and FALSE in order to meet the same condition. In general, at least two BOOLEAN-value expressions can also be OR-linked, which will be discussed hereinbelow.

In accordance with a further advantageous embodiment of the method, an evaluator uses an evaluation function to check a condition, wherein at least two different evaluators use a different evaluation function, in particular an operation-specific evaluation function. In general, it is possible that all evaluators use the same evaluation function. However, by providing different evaluation functions, there is a greater degree of flexibility when performing the method according to the invention for controlling the conditions under which cryptographic material is used by system components.

In general, a generic evaluation function can also be used, whereby all cryptographic material, or the conditions comprised by the cryptographic material, can be evaluated by providing merely one function. However, the evaluation function can also be designed specifically for different cryptographic materials, for example depending on the role of the cryptographic material. In particular, another distinction is made for different evaluation functions for different operations.

A further advantageous embodiment of the method according to the invention provides that at least one condition is defined in a machine-processable definition language, wherein an executable language that can be interpreted by an interpreter or one of the following formal logics is used:
propositional logic;
propositional logic with relations; or
propositional logic with relations and functions.

Defining the condition in a machine-processable definition language allows existing languages to be used for performing the method according to the invention. By using a definition language that can be evaluated, conditions can be formulated using the applicable variables that describe a state of the system component, for example as BOOLEAN-value expressions defined and processable using the definition language. If the cryptographic material has a plurality of conditions, a variable set relevant for the corresponding condition can also contain different variables. All variables of a corresponding variable set can be of the same type, i.e., BOOLEAN, INTEGER or STRING, or at least two variables of a variable set relevant for a respective condition can differ in their type. The same or different machine-processable definition languages can also be used together for different conditions comprised by the cryptographic material.

In the case of the known propositional, all variables relevant for a particular condition have the value range BOOLEAN. The individual variables can therefore only assume the values TRUE or FALSE. Logic formulas are formed using known propositional logic connectives, i.e. "$\wedge$", "$\vee$", " " or the like, and brackets "(", ")". Examples of propositional logic formulas are:
Variable1;
Variable2$\wedge$TRUE;
(Variable1$\wedge$(Variable2$\vee$Variable3)).

In propositional logic with relations, variables relevant for a particular condition can have different value ranges. There is a finite set of relations, wherein each relation is assigned a fixed arity, and each relation and the place is assigned a fixed value range. A relational term then results by applying a relation to a number of constants and/or variables with the suitable value ranges that corresponds to the arity. When evaluating a relational term for a fixed predefined value assignment of the variables occurring in this term, the result is always a Boolean value, i.e., TRUE or FALSE. One example for a binary relation which requires INTEGER as the value range in both places is the less than or equal to relation "$\leq$", and relational terms based on this relation would be, for example:
Variable1$\leq$Variable2;
7$\leq$Variable3.

Logic formulas are formed using BOOLEAN constants, BOOLEAN variables, relational terms and known propositional logic connectives $\wedge$, $\vee$, etc. and brackets "(" and ")" to determine the evaluation sequence. One example of a propositional logic formula with relations that uses the binary relations "$\leq$" and "=", is:
(Variable1$\wedge$((Variable2$\leq$Variable3)$\vee$
(Variable3=Variable4))).

In propositional logic with relations and functions, a finite set of functions is additionally used, wherein each function is assigned a fixed arity, and each function and each place is assigned a fixed value range. In addition, the value range of the result is defined for each function. A function is then applied to number of constants, variables, and/or functions with the suitable value ranges that corresponds to the arity and returns a value from the predefined result-value range. One example for a binary function, which requires INTEGER as value range in both places and returns an INTEGER value as a result, is the addition "+". Logical formulas are formed with relations in the same way as with propositional logic, with the difference that relational terms can be formed not only by applying relations to constants and/or variables, but also functions applied to constants/variables with a corresponding result value range. One example of a propositional logic formula with relations and functions is:
(Variable1$\wedge$((Variable2$\leq$(Variable3+Variable7))$\vee$
(((Variable3−Variable8)+Variable2)=Variable4))).

In particular, by contrast, the use of an executable language that can be interpreted by an interpreter offers advantages. Such languages are very "powerful" due to their executability. This means that no previous translation/compilation, or transformation into a formula tree and insertion of variable values is necessary before executing a corresponding program code. An interpretable executable language can be, for example, a script language such as Python.

In accordance with a further advantageous embodiment of the method according to the invention, at least two conditions are formulated in a different definition language, in particular two target-component-specific conditions are formulated in a different definition language. If a first system component uses a first language and a second system component uses a second language, different from the first language, the provision of two conditions formulated with different definition languages ensures that both system components can also evaluate the condition relevant to them. Accordingly, the variables relevant for the conditions are formulated in the respective definition language. It is also possible that two conditions valid for the same system component are formulated in a different definition language. It can thus be advantageous to formulate a particular condition with a particular definition language. This is the case, for example, if the detection and/or processing of particular variables is only possible with a particular definition language or if this is prescribed due to a wide variety of boundary conditions.

A further advantageous embodiment of the method according to the invention provides that the cryptographic material comprises at least two conditions and all conditions have to be met so that the cryptographic material can be used by the system component. Referring back to the use of formal logic, this means that the conditions used are AND-linked. Thus, all conditions have to be met so that the cryptographic material can be used by the system component. Thus, it is necessary for an individual condition to be met in order for the system component to use the cryptographic material, but this is not necessarily sufficient, since at least one further condition has to be met.

In accordance with a further advantageous embodiment of the method, if cryptographic material is to be used a system component whose target-component-specific condition does not comprise the class of the corresponding system component, if an operation is to be performed by using the cryptographic material, which is not included in an operation-specific condition or if an evaluator cannot detect a variable required for checking a state, the evaluator returns the following answer by default:

TRUE;
FALSE; or
an answer appended to the cryptographic material as a standard answer.

This ensures an even more reliable implementation of the method according to the invention. For example, in a system component or a class the system component, from which particular cryptographic materials are to be used, can, in general, not be included in a target-component-specific condition. To ensure that the cryptographic material can still be used by the corresponding system component, the value TRUE is output by default after checking the target-component-specific condition. If instead the use of the cryptographic material is to be prevented in such a case, the value FALSE is output by default. To increase the flexibility of the method according to the invention, the standard answer can also be appended to the cryptographic material in the form of TRUE or FALSE. This reduces the risk that the cryptographic material is applied to a system component whose standard answer is set to TRUE, even though this should not actually be the case. Thus, in this case, the standard answer is appended to the cryptographic material in the form of FALSE.

The formulations used above apply correspondingly to an operation-specific condition, and for the case that an evaluator cannot detect a variable required for checking a particular condition.

A further advantageous embodiment of the method according to the invention provides that all additional data comprised by the cryptographic material is cryptographically secured against being compromised, in particular using at least one digital signature and/or a symmetric integrity protection mechanism. A Keyed-Hash Message Authentication Code (HMAC) can be used in particular as a symmetric integrity protection mechanism. Securing the cryptographic materials against being compromised further increases protection when carrying out the method the according to the invention. Thus, the additional data appended to the cryptomaterial package along with the cryptographic material can be protected against unauthorized manipulation. For example, the cryptographic material and the associated additional data can be digitally signed by the creator using its asymmetric private key. In particular, secure methods and secure systems are used for signing. The public key or a certificate containing the public key is then distributed to all the relevant evaluators. The corresponding public key or the certificate is inserted into the corresponding systems in a manipulation-proof manner. For example, the public key or the certificate is saved in a write-protected memory (ROM) or in a memory that can only be written to once (WORM). The cryptomaterial package accordingly comprises such a digital signature. Accordingly, the cryptographic material is then only used by the system component if a check of the signature appended to the cryptographic material using the introduced public key or the certificate returns a positive result.

In accordance with a further advantageous embodiment of the method according to the invention, at least two different actors are authorized to digitally sign the cryptographic material, wherein all actors authorized to sign receive their own leaf certificate belonging to a common certificate hierarchy with the associated private key. It is thus then particularly expedient to authorize several actors to sign digitally if several actors also create cryptographic material. A system performing the signature then signs the corresponding cryptographic material with the private key belonging to its leaf certificate. Not just the generated signature, but also the entire certificate chain is then added to the cryptographic material. The certificate chain appended to the cryptographic material is then used by a corresponding evaluator or a system comprising the evaluator to check the correctness of the signature created by the signing system.

If the cryptographic material is already a digital certificate, then it is signed from the outset. If additional data, i.e., at least one condition, role and/or target component identity, is then included in the certificate, this is co-signed by the creator of the certificate. Thus, the additional data, or only parts thereof, can be included as one or more certificate extensions in the corresponding certificate thus co-signed. If all additional data is included in the certificate, then the dedicated creation of the digital signature for the cryptographic materials can be dispensed with.

To guarantee the best possible protection, the method according to the invention should be used as early as possible in the development of a corresponding system component. Because the checking of the condition by the evaluator depends on variables, these variables must be protected as far as possible against manipulation, since corrupted variables can conceal the presence of an actually non-existing state. Constants used to assess a condition are accordingly preferably stored in a write-once memory such as a WORM memory. The values of the variables, on which the conditions depend, are preferably adapted in a systematic manner to the current system state during the entire service life of the information technology system or the individual system components.

A vehicle ecosystem is preferably used as an information technology system. In general, the method according to the invention can be used for various system components in a wide variety of networked or non-networked information technology systems. Use is particularly efficient if the information technology system is a vehicle ecosystem, since here the corresponding requirements in respect of a complex development involving many partners often make it very difficult in practice comply with security regulations. By implementing the method according to the invention and thus a self-check by the respective system component, the risk of a potential security breach can be drastically minimized.

Further advantageous embodiments of the method according to the invention for implementing and using cryptographic material in at least one system component of an information technology system also result from the exemplary embodiments, which are described in more detail hereinbelow with reference to the figures.

DETAILED DESCRIPTION

Figure 1:
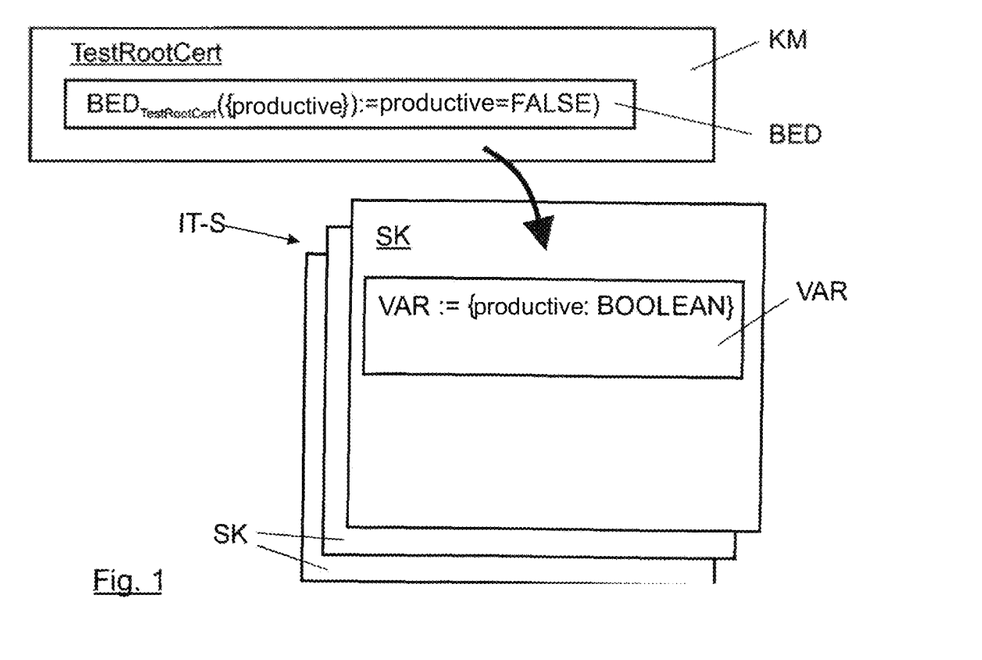
FIG. 1 shows a schematic diagram of the first use of cryptographic material on a system component of an information technology system.

FIG. 1 shows a first exemplary embodiment for the use of cryptographic material KM of at least one system component SK of an information technology system IT-S. A state of the system component SK is described using at least one variable VAR. In the example in FIG. 1, the set of all variables VAR is referred to as VAR and the individual state variable used here is referred to as "productive". The state variable productive indicates whether the system component SK is in a productive phase of its life cycle, i.e., whether it is a productive system or not. The cryptographic material KM is a self-signed Test-Root certificate TestRootCert belonging to a Test-Root key pair (TestRootPub, TestRoot-Priv), which certificate is introduced into the target system as a trust anchor in order to establish test links with communication partners by using TestRootCert to check the trustworthiness of the certificates received from partners signed with TestRootPriv.

The certificate TestRootCert has been created under insecure conditions, for example the private key TestRootPriv has not been saved securely. Thus, TestRootCert should not be used in productive systems. Accordingly, a condition BED comprised by the cryptographic material KM is defined as productive=FALSE. The condition BED states that the certificate TestRootCert may only be used by the target system, i.e., the system component SK, if it is not in the productive phase.

Figure 2:
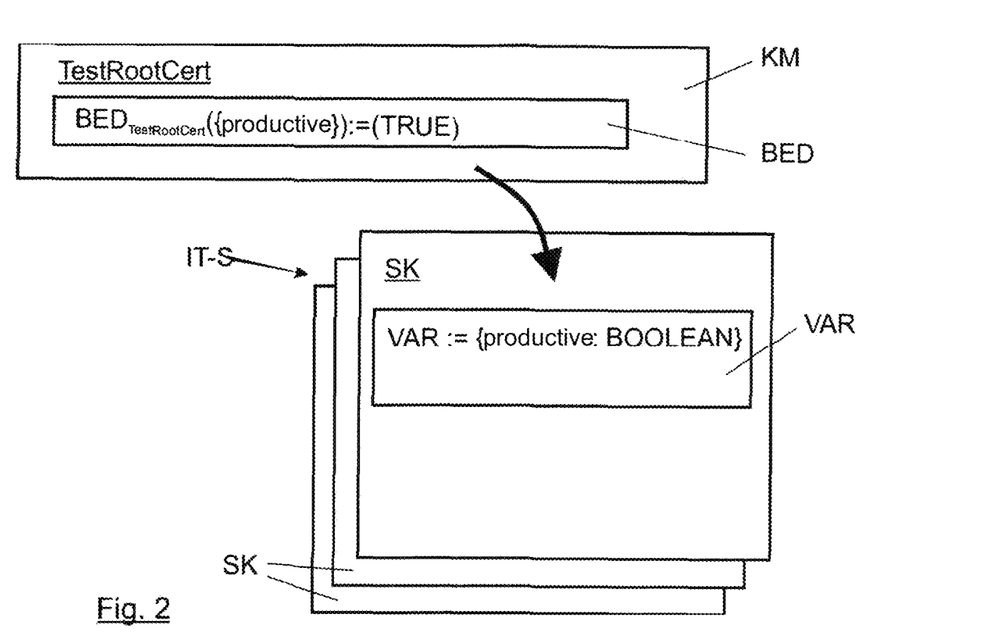
FIG. 2 shows a schematic diagram of the use of alternative cryptographic material on the system component shown in FIG. 1.

FIG. 2 shows a similar exemplary embodiment, in which the cryptographic material KM now comprises a securely generated certificate ProdRootCert that can be securely used in productive systems. Accordingly, the certificate ProdRootCert may always be used by the target system, i.e., the system component SK, for example even in the development and in the productive phases. ProdRootCert may also be used in the development phase because it does not contain any secret portions. Accordingly, the condition BED does not depend on the state variable productive either, but it is always considered to be met (TRUE). Since the condition BED does not depend on any variable VAR, it would also be possible to select an empty set of state variables, i.e. $BED_{TestRootCert}(\{\ \}):=(TRUE)$ instead of $BED_{TestRootCert}(\{productive\}):=(TRUE)$.

Figure 3:
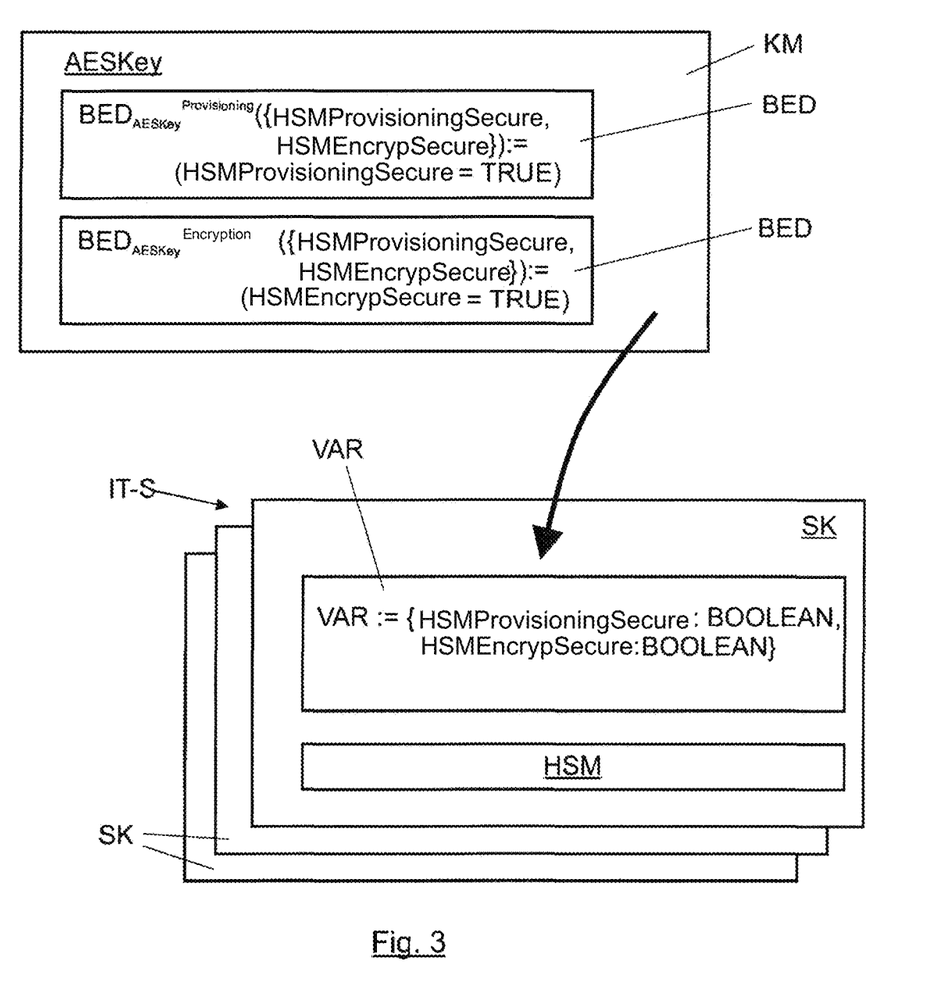
FIG. 3 shows a schematic diagram of the use of alternative cryptographic material on a further system component.

FIG. 3 shows a further exemplary embodiment of implementing and using cryptographic material KM in a system component SK. The system component SK has two state variables here, namely the two elements HSMProvisioningSecure: BOOLEAN, and HSMEncrypSecure: BOOLEAN of the set of variables VAR. The set of variables VAR corresponds here to a vector with two elements. The state variable HSMProvisioningSecure indicates whether a hardware security module HSM is already in a state in which it can securely receive and save cryptographic material KM. The state variable HSMEncrypSecure indicates whether the hardware security module HSM is already in a state in which it can securely use the secret keys saved in it for encryption. The cryptographic material KM in FIG. 3 is a 256-bit long, secret symmetric key AESKey, which is intended to be used for AES encryption in productive systems.

Two operations are intended to be secured by conditions BED. First, this involves the provision of cryptographic material KM, i.e., the secure introduction and secure saving of a key in the system component SK. This also involves encryption, in other words the secure use of a key for the encryption in the system component SK. The secure use of the key in the target system is ensured by two conditions BED $BED_{AESKey}^{provisioning}$ and $BED_{AESKey}^{encryption}$. The condition BED $BED_{AESKey}^{provisioning}$ states that the Key AESKey is only allowed to be introduced into the target system if HSMProvisioningSecure=TRUE. The condition BED $BED_{AESKey}^{encryption}$ states that the Key AESKey in the target system is only allowed to be used for the encryption if HSMEncrypSecure=TRUE.

Figure 4:
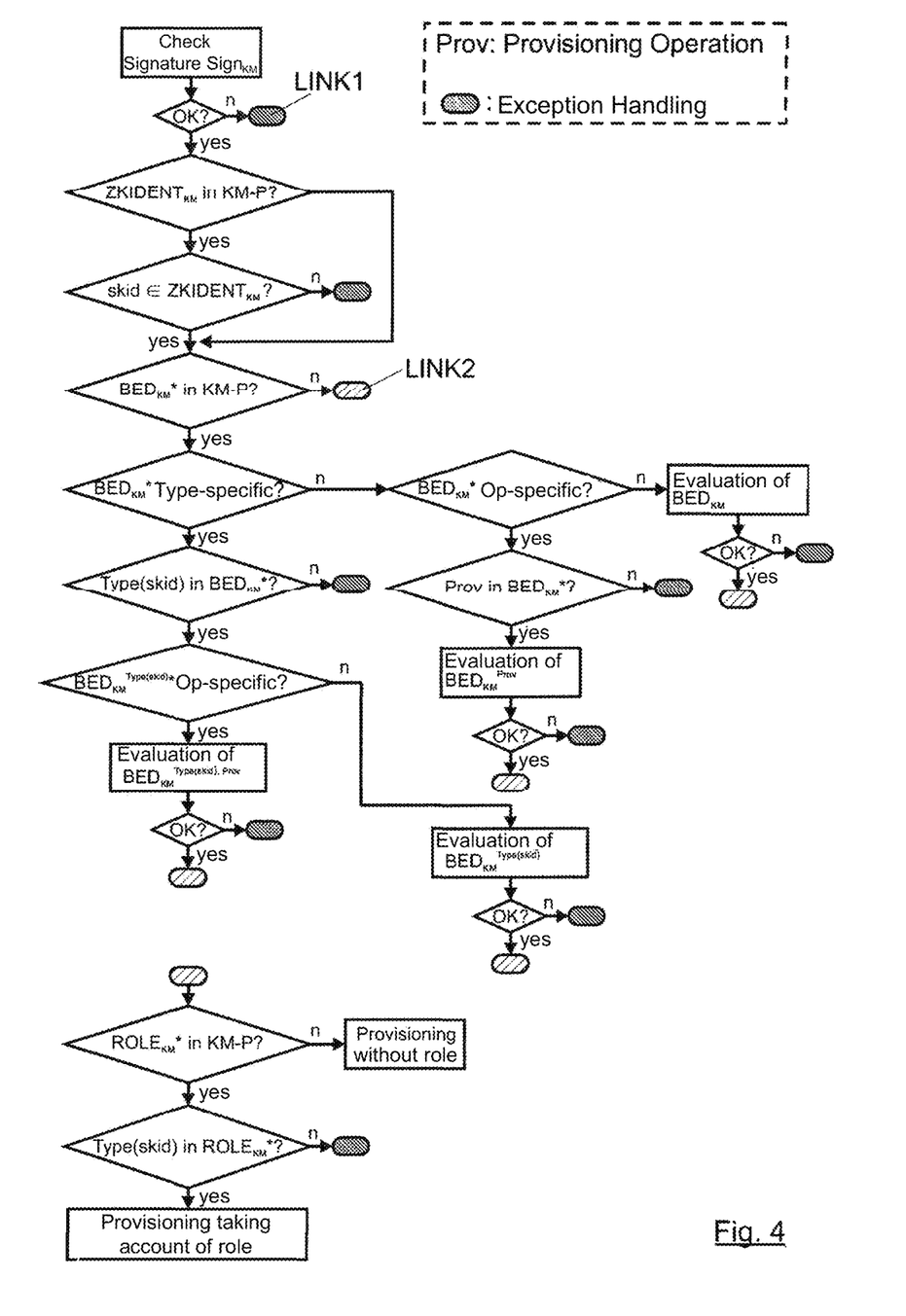
FIG. 4 shows a flow chart depicting an example of processing cryptographic material on a system component when executing an operation.

FIG. 4 shows a flow chart of a method according to the invention. It is assumed here that a cryptomaterial package KM-P has the following form: KM-P=(KM, $ZKIDENT_{KM}$, $BED_{KM}^*$, $ROLE_{KM}^*$, $Sign_{KM}$, ZK), wherein $ZKIDENT_{KM}$ denotes the entirety of the target component identities $ZKIDENT_{KM}$ allowed for the cryptographic material KM, $BED_{KM}^*$ denotes the entirety of the optionally target-component-specific and/or operation-specific conditions BED assigned to the cryptographic material KM, and $ROLE_{KM}^*$ denotes the entirety of the optionally target-component-specific roles $ROLE_{KM}^*$. In this case, at least one of the mentioned variables $ZKIDENT_{KM}$, $BED_{KM}^*$, $ROLE_{KM}^*$ can also be missing in the cryptomaterial package KM-P. $Sign_{KM}$ is the signature of (KM, $ZKIDENT_{KM}$, $BED_{KM}^*$, $ROLE_{KM}^*$) created by the creator of the cryptographic material KM and ZK is the certificate chain used by the system component SK to check the correctness of the signature $Sign_{KM}$. To uniquely address a system component SK, it is also assumed that the system component SK has the identity skid and the target system component type Type (skid). For example, the identity skid and the target system component type Type(skid) can be included on a system component SK in the variables VAR. A system component type can also be understood as a class of system components SK, for example all system components SK of the class/the type "head unit", "engine control unit", or the like. It is also assumed that the evaluator wants to check whether the cryptographic material KM contained in the cryptomaterial package KM-P may be installed in the system component SK for an operation Prov in the system component SK. The operation can, in general, be any operation, such as for example performing a decryption process. In the example in FIG. 4, the operation is the actual provisioning of the cryptographic material KM.

First, the signature $Sign_{KM}$ is checked. If the signature check is unsuccessful, exception handling takes place in accordance with a first link LINK1. If the signature check is successful, by contrast, it is checked whether the cryptographic material KM, here in the form of the cryptomaterial package KM-P, comprises at least one target component identity $ZKIDENT_{KM}$. If this is the case, it is checked whether the identity skid of the system component SK is comprised by the target component identity $ZKIDENT_{KM}$, and if not, exception handling is initiated in accordance with the first link LINK1. If, however, this is not the case, i.e., the cryptomaterial package KM-P does not comprise a target component identity $ZKIDENT_{KM}$, this step is skipped.

It is then checked whether and if so which conditions $BED_{KM}*$ are contained in the cryptographic material KM. If the crytomaterial package KM-P does not comprise a condition $BED_{KM}*$, the process continues in accordance with a second link LINK2, which could mean the installation of the cryptographic material KM.

It is subsequently investigated whether at least one condition $BED_{KM}*$ is target-component-specific.

If this is not the case, it is checked whether at least one condition $BED_{KM}*$ is operation-specific.

If this is not the case, the corresponding condition $BED_{KM}$ is evaluated and the process continues in accordance with the first or second link LINK1, LINK2.

If, by contrast, it is established that the at least one condition $BED_{KM}*$ is operation-specific, then it is checked whether provision of the cryptographic material KM is intended as an operation a provision, i.e. provisioning. If this is the case, then the operation-specific condition $BED_{KM}^{Prov}$ is checked. Then the process continues in the same way as for the links LINK1, LINK2.

If, by contrast, at least one type-specific condition has been detected in the crytomaterial package KM-P, it is checked whether at least one of the type-specific conditions is also valid for an entire class of system components SK, i.e., whether Type(skid) is contained in $BED_{KM}*$. The set of valid conditions for the respective classes referenced by Type(skid) is referred to hereinbelow as $BED_{KM}^{Type(skid)}*$. If this is the case, then provisioning takes place (see first link LINK1). If this is not the case, a check must be made to see which standard method is to be applied. In other words, whether provisioning may or may not. For this purpose, for example a standard answer can be included in the crytomaterial package KM-P.

It is subsequently checked whether the type-specific condition $BED_{KM}^{Type(skid)}*$ is also additionally operation-specific. If this is not the case, the condition $BED_{KM}^{Type(skid)}$ is evaluated and the process continues in accordance with the links LINK1, LINK2. If, however, the conditions $BED_{KM}^{Type(skid)}*$ are operation-specific, it is checked whether at least one operation-specific condition, here as a representative example for the operation Prov ("Provisioning"), i.e., a condition $BED_{KM}^{Type(skid), Prov}$, is comprised in $BED_{KM}^{Type(skid)}*$ (this step is not shown in FIG. 4). If this is not the case, exception handling is initiated in accordance with the first link LINK1. If, by contrast, this is the case, i.e., $BED_{KM}^{Type(skid)}*$ contains a condition $BED_{KM}^{Type(skid), Prov}$, this is evaluated and the process continues as for the links LINK1, LINK2.

After evaluating the individual conditions $BED_{KM}$, $BED_{KM}^{Prov}$, $BED_{KM}^{Type(skid)}$, or $BED_{KM}^{Type(skid), Prov}$ it is checked whether the cryptographic material KM, here in the form of the crytomaterial package KM-P, comprises at least one role $ROLE_{KM}*$. If this is not the case, the cryptographic material KM is provided for the system component SK without role. If, by contrast, this is the case, then it is checked whether $ROLE_{KM}*$ comprises a role for the target component type Type(skid). If this is not the case, exception handling takes place once more. If, by contrast, this is the case, the cryptographic material KM is provided with account being taken of the role $ROLE_{KM}*$.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for implementing and using cryptographic material in at least one system component of an information technology system for performing at least one operation, the method comprising:
    checking a state of the at least one system component as described by at least one variable at least at a first time;
    forming additional data by at least one condition, at least a role, or at least one target component identity, wherein the additional data describe possible states of system components, and wherein all additional data comprised by the cryptographic material is cryptographically secured against being compromised;
    supplementing the cryptographic material with the additional data; and
    using the cryptographic material by the at least one system component when the additional data of the cryptographic material comprise at least the state that the system component has at the first time.

2. The method of claim 1, wherein the all additional data comprised by the cryptographic material is cryptographically secured against being compromised using at least one digital signature or a symmetric integrity protection mechanism.

3. The method of claim 1, wherein the cryptographic material comprises at least one target-component-specific role.

4. The method of claim 1, wherein all conditions are defined by a creator external to the system component and evaluated by at least one evaluator executed in an environment of the system component, wherein the creator and the evaluator jointly determine which variables may be used by the creator in the definition.

5. The method of claim 1, wherein the at least one variable has one of the following value ranges:
    BOOLEAN;
    INTEGER; or
    STRING.

6. The method of claim 1, wherein the at least one condition is defined target-component-specifically or operation-specifically.

7. The method of claim 6, wherein the at least one different variable is used for a target-component-specific or operation-specific condition on a different target component or for a different operation.

8. The method of claim 7, wherein an evaluator uses an evaluation function to check the at least one condition, wherein at least two different evaluators use a different evaluation function.

9. The method of claim 1, wherein the at least one condition is defined in a machine-processable definition language, wherein an executable language that can be interpreted by an interpreter or one of the following formal logics is used:
- propositional logic;
- propositional logic with relations; or
- propositional logic with relations and functions.

10. The method of claim 9, wherein the at least one condition includes at least two conditions formulated in a definition language that differs from one another.

11. The method of claim 10, wherein the cryptographic material comprises the at least two conditions and all of the at least two conditions must be met for the cryptographic material to be used by the system component.

12. The method of claim 6, wherein if cryptographic material is to be used, a system component whose target-component-specific condition does not comprise a class of the corresponding system component, if an operation is to be performed by using the cryptographic material, which is not included in an operation-specific condition or if an evaluator cannot detect a variable required for checking a state, the evaluator returns the following answer by default for the respective condition:
- TRUE;
- FALSE; or
- an answer appended to the cryptographic material as a standard answer.

13. The method of claim 11, wherein at least two different actors are authorized to digitally sign the cryptographic material, wherein all actors authorized to sign receive the private keys respectively assigned to them with an associated individual leaf certificates and an associated certificate chain.

14. The method of claim 1, wherein the information technology system Is a vehicle ecosystem.

* * * * *